United States Patent
Ooe (10) Patent No.: US 11,117,152 B2
(45) Date of Patent: Sep. 14, 2021

(54) APPLICATION ROBOT

(71) Applicant: DAIFUKU CO., LTD., Osaka (JP)

(72) Inventor: Masahiro Ooe, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 22 days.

(21) Appl. No.: 16/867,617

(22) Filed: May 6, 2020

(65) Prior Publication Data

US 2020/0368770 A1 Nov. 26, 2020

(30) Foreign Application Priority Data

May 21, 2019 (JP) .............................. JP2019-094917

(51) Int. Cl.
| | |
|---|---|
| *B05B 13/04* | (2006.01) |
| *B25J 13/08* | (2006.01) |
| *B25J 19/02* | (2006.01) |
| *B25J 11/00* | (2006.01) |

(52) U.S. Cl.
CPC ...... *B05B 13/0431* (2013.01); *B05B 13/0452* (2013.01); *B25J 11/0075* (2013.01); *B25J 13/089* (2013.01); *B25J 19/023* (2013.01)

(58) Field of Classification Search
USPC .......................... 118/302, 323, 321, 712, 686
See application file for complete search history.

(56) References Cited

U.S. PATENT DOCUMENTS

| | | | | |
|---|---|---|---|---|
| 6,458,424 | B1 * | 10/2002 | Yoshida | .............. B05B 12/1463 |
| | | | | 427/426 |
| 2006/0292308 | A1 * | 12/2006 | Clifford | ................. B25J 9/0093 |
| | | | | 427/427.2 |
| 2010/0047465 | A1 * | 2/2010 | Ansorge | .............. B05B 13/0452 |
| | | | | 427/427.3 |
| 2011/0262622 | A1 * | 10/2011 | Herre | ................... B05C 11/1015 |
| | | | | 427/8 |

FOREIGN PATENT DOCUMENTS

JP H5-97077 A 4/1993

* cited by examiner

*Primary Examiner* — Yewebdar T Tadesse
(74) *Attorney, Agent, or Firm* — Kusner & Jaffe (57) ABSTRACT

An application robot applies a primer to a car body. The application robot includes an applicator for the primer, a camera, a controller, a cap for preventing dripping of the primer, a cap attaching/detaching unit for collecting the cap, and an arm. The camera is moved with the applicator to which the cap is attached, and detects the position of a specific part on the body, the camera being moved by activating the arm. The applicator applies the primer to a position to apply the primer on the body after the cap is detached, the position being specified by the controller. The cap attaching/detaching unit moves the cap holding part toward the body and collects the cap.

4 Claims, 6 Drawing Sheets

APPLICATION ROBOT

FIELD OF THE INVENTION

The present invention relates to an application robot that applies fluid agents to a conveyed object conveyed by a conveyor.

BACKGROUND OF THE INVENTION

A conventional application robot that applies fluid agents to a conveyed object conveyed by a conveyor is described in Japanese Patent Laid-Open No. 5-97077.

The application robot of Japanese Patent Laid-Open No. 5-97077 is a robot for applying a primer to the attachment part of the windshield of a car body on an automobile assembly line. The application robot of Japanese Patent Laid-Open No. 5-97077 is installed in a primer coating station for applying a primer to the attachment part of a windshield at the front of a car body. The robot applies the primer to the attachment part of the windshield of the car body conveyed to a predetermined position in the primer coating station after being painted on a paint line.

On a conventional automobile assembly line, the attachment part of the windshield of the car body is coated with a primer after interior parts such as an instrument panel unit are attached to a car body. Thus, it is necessary to quite carefully perform a manual application operation of the primer so as to prevent the primer from dripping onto the interior parts. In an automobile assembly method described in Japanese Patent Laid-Open No. 5-97077, a primer is applied before interior parts are attached to a car body. This can quickly apply the primer to the attachment part of the windshield of the car body without contaminating the interior parts with the primer. Moreover, the primer can be automatically applied.

In the automobile assembly method described in Japanese Patent Laid-Open No. 5-97077, however, the primer may drip from a brush and fall onto a part other than the attachment part of the windshield of the car body and cause contamination on the car body when the brush is moved from the side of the car body to the attachment part of the windshield (a position for starting the application of the primer on the car body). Hence, if a primer is automatically applied by an application robot as in the automobile assembly method described in Japanese Patent Laid-Open No. 5-97077, it is necessary to move a brush toward a car body while avoiding dripping of the primer from the brush. Unfortunately, this leads to difficulty in quickly applying the primer to the car body in an automatic operation by the application robot.

SUMMARY OF THE INVENTION

An object of the present invention is to provide an application robot capable of quickly and automatically applying fluid agents to a conveyed object conveyed by a conveyor without dripping the fluid agents to a position other than a position to be coated with the fluid agents.

DISCLOSURE OF THE INVENTION

The object of the present invention is as described above, and a solution to this object will be described below.

An application robot according to the present invention is an application robot that applies fluid agents to a conveyed object conveyed by a conveyor, the application robot including: an applicator to apply the fluid agents to the conveyed object; a position sensor to detect the position of a specific part on the conveyed object; a controller to specify a position to apply the fluid agents based on a detection result of the position sensor; a dripping preventing member that is removably provided on the applicator and prevents dripping of the fluid agents when the fluid agents is not applied; a collector to collect the dripping preventing member detached from the applicator; and an arm that supports the applicator so as to move the applicator to the position to apply the fluid agents, wherein the position sensor is provided on the arm along with the applicator, so as to be moved by operation of the arm to detect the position of the specific part on the conveyed object while the dripping preventing member is attached to the applicator, wherein upon the position to apply the agents being specified by the controller and the dripping preventing member being detached, the applicator applies the agents onto the conveyed object, and wherein the collector includes a collection part to collect the dripping preventing member and an extending part to move and extend toward the conveyed object while supporting the collecting part, the collecting part being moved toward the conveyed object by the extension of the extending part so as to collect the dripping preventing member.

In this configuration, when the position sensor detects the position of the specific part on the conveyed object, the applicator with the attached dripping preventing member moves along with the position sensor. When the fluid agents is applied to the conveyed object, the applicator applies the fluid agents in a state in which the dripping preventing member is collected by the collector that moves toward the conveyed object.

The application robot of the present invention includes a receiver to receive the fluid agents dripping from the applicator, wherein the receiver is provided on the collector and is moved to the conveyed object by the extension and movement of the extending part.

In this configuration, the receiver receives the fluid agents dripping from the applicator after the receiver is moved with the collector toward the conveyed object.

Furthermore, the position sensor includes an imaging unit to capture an image of the conveyed object, and the position sensor detects the position of the specific part on the conveyed object and a state of application of the fluid agents by the applicator on the conveyed object based on the image of the conveyed object, the image being captured by the imaging unit.

In this configuration, the position sensor detects the position of the specific part on the conveyed object and a state of application of the fluid agents on the conveyed object based on the image of the conveyed object, the image being captured by the imaging unit.

Moreover, the conveyed object is a body, and the position sensor detects, from above the body, the position of a specific part on the body, and the applicator applies the fluid agents from above the body.

In this configuration, the application robot detects the position of the specific part on the body and applies the fluid agents to the body from above the body.

In the application robot of the present invention, the applicator can start applying the fluid agents to the conveyed object from a state in which the dripping preventing member is collected into the collecting part of the collector that moves toward the conveyed object, thereby quickly and automatically performing an application operation of the fluid agents without dripping the fluid agents to a position other than a position to apply the fluid agents on the conveyed object.

DETAILED DESCRIPTION OF THE INVENTION

An application robot 10 of the present invention will be described below. The present invention is not limited to the application robot 10.

Figure 1:
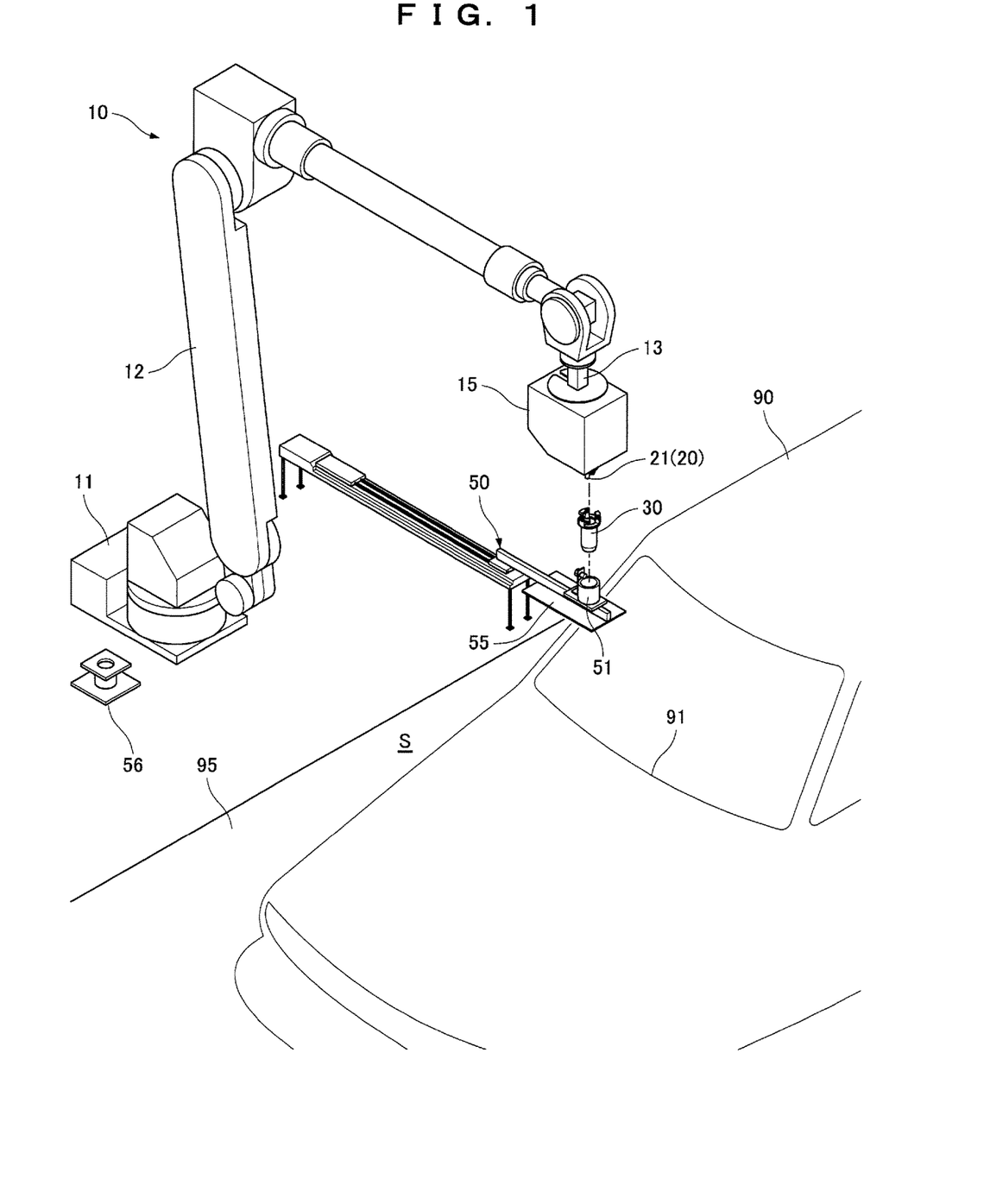
FIG. 1 is a perspective view of an application robot according to the present invention.

As illustrated in FIG. 1, the application robot 10 is a robot for applying a primer (an example of "fluid agents") to an attachment part 91 of a windshield at the front of a car body 90 (an example of "conveyed object"). In this configuration, the attachment part 91 of the windshield is a bonding surface at the front part of the car body 90, where the windshield is to be bonded.

The application robot 10 is disposed in a factory including an automobile production line. Specifically, the application robot 10 is disposed near a conveyor 95 that conveys the car body 90 along a transportation path, that is, an area for applying the car body 90 with the primer (primer application area) in the automobile production line. The application robot 10 applies the primer to the car body 90 that is conveyed to a predetermined position S in the primer application area of the automobile production line by the conveyor 95.

Figure 2:
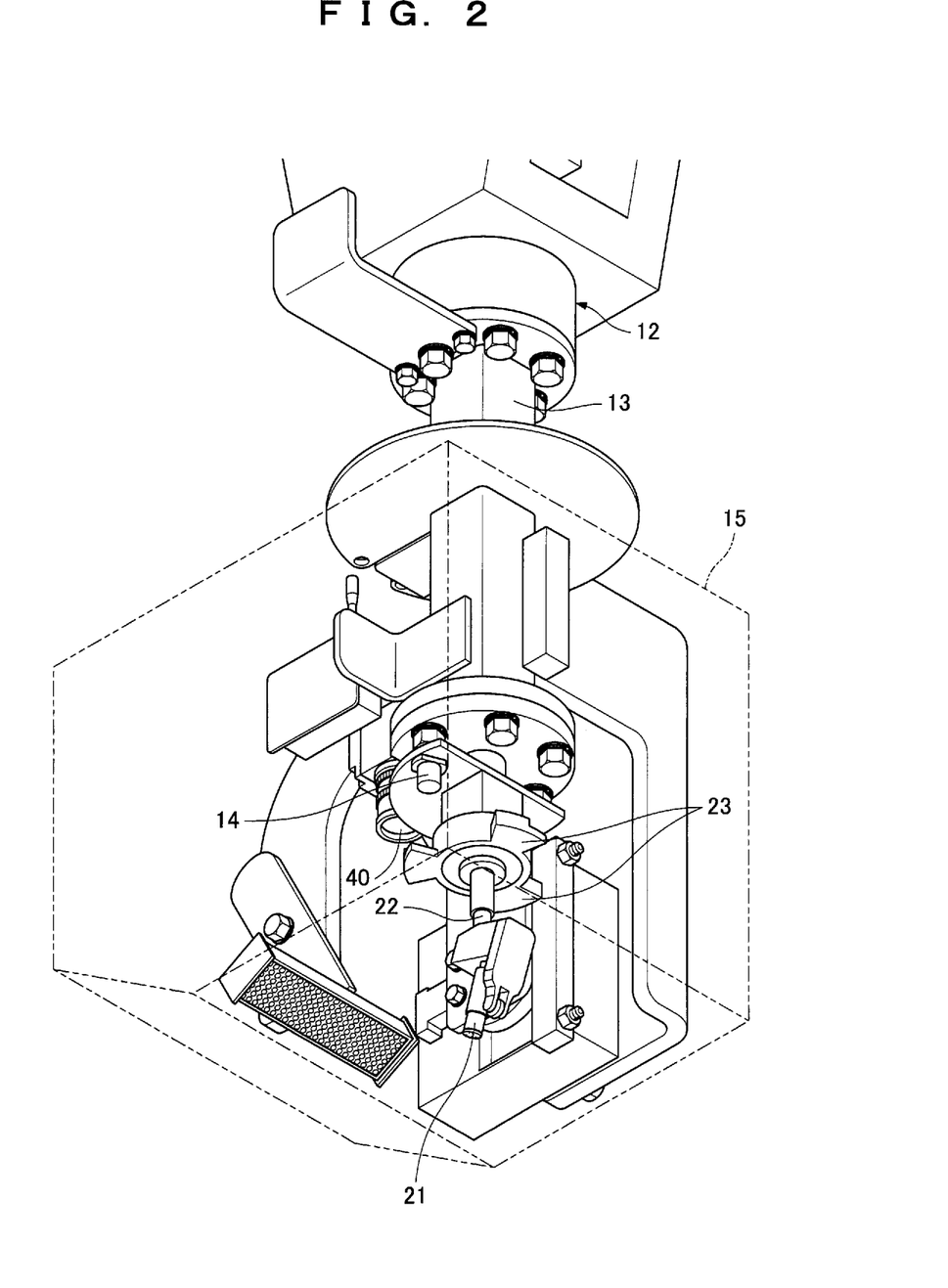
FIG. 2 is a perspective view of the vicinity of an applicator for the application robot according to the present invention.
Figure 5:
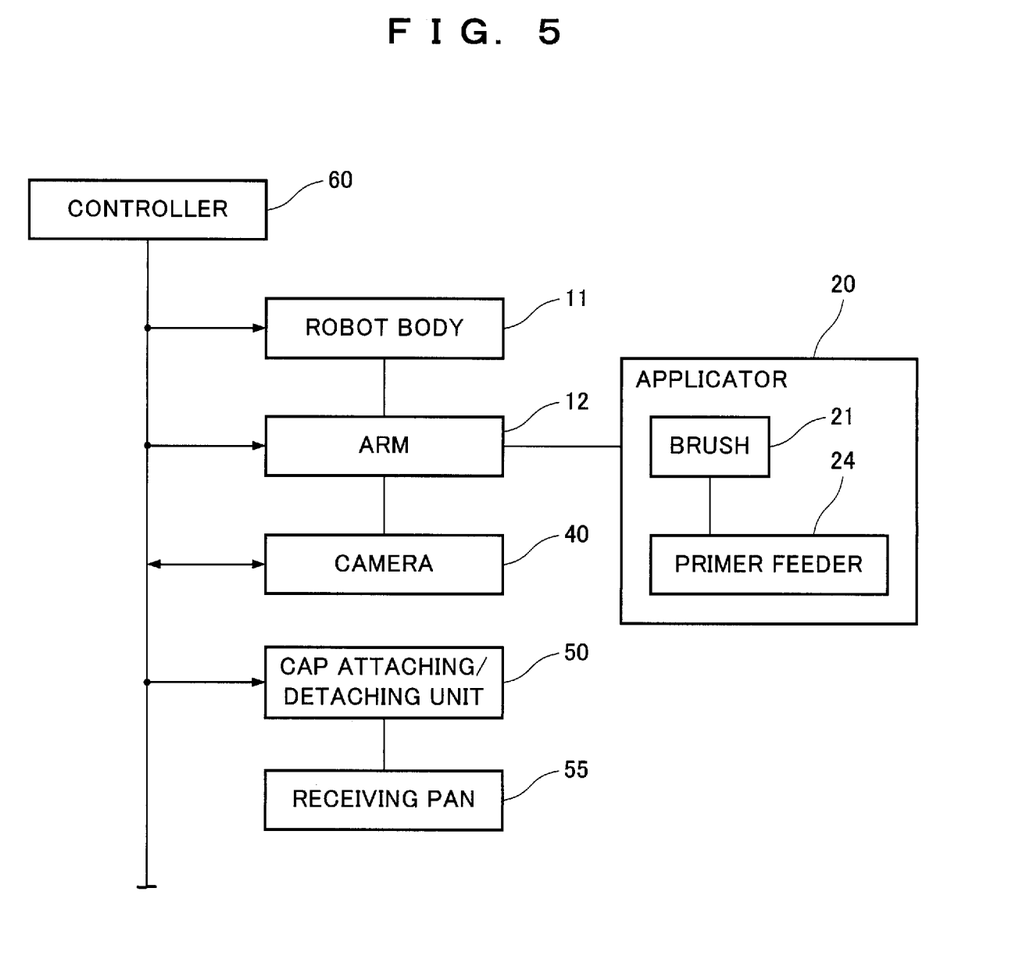
FIG. 5 is a block diagram illustrating the control configuration of an application robot according to the related art.

As depicted in FIGS. 1, 2, and 5, the application robot 10 comprises a robot body 11, an arm 12 provided on the robot body 11, an applicator 20 that applies the primer to the car body 90, a cap 30 (an example of "dripping preventing member") that is removably provided on a brush 21 of the applicator 20 and prevents dripping of the primer from the brush 21, a camera 40 (an example of "position sensor" and "imaging unit") that captures an image of the car body 90, a cap attaching/detaching unit 50 (an example of "collector") that attaches or detaches the cap 30 to or from the brush 21, a receiving pan 55 (an example of "receiver") that receives the primer dripping from the brush 21, a brush holder 56 that holds the brush 21 after the cap 30 is removed, and a controller 60 (an example of "position sensor" and "controller") that controls the overall application robot 10.

The robot body 11 pivotally supports the arm 12. The robot body 11 is disposed near the conveyor 95. The robot body 11 turns the arm 12 toward the car body 90 conveyed to the predetermined position S by the conveyor 95.

The arm 12 is supported by the robot body 11. The arm 12 moves so that the tip of the arm approaches the car body 90 conveyed to the predetermined position S by the conveyor 95. At the tip side of the arm 12, a tip holding part 13 for holding the applicator 20 and the camera 40 is provided. The arm 12 moves the tip holding part 13 so as to move the applicator 20 and the camera 40 to a predetermined position.

As illustrated in FIG. 2, the tip holding part 13 holds the applicator 20 at the tip side of the tip holding part 13 and holds the camera 40 at a higher position than the applicator 20. At the tip side of the tip holding part 13, a cap sensor 14 for detecting the presence or absence of the cap 30 is provided.

At the tip of the arm 12, a cover 15 is attached so as to cover the tip holding part 13 and the camera 40.

The cover 15 includes a box member that can accommodate the tip holding part 13 and the camera 40. One side of the cover 15 is fixed to the arm 12 and the other side is opened. The brush 21 of the applicator 20 projects out of the opening of the other side of the cover 15.

The applicator 20 comprises the brush 21 for applying the primer to the car body 90, a brush holding part 22 holding the brush 21, and a primer feeder 24 (FIG. 5) for feeding the primer to the brush 21.

The brush 21 is attached to the tip of the brush holding part 22. The primer is fed to the brush 21 from the primer feeder 24 through a pipe or the like. The brush 21 is moved above the car body 90 by activating the arm 12, so that the primer fed from the primer feeder 24 is applied to the car body 90 from above.

The brush holding part 22 is provided so as to rotate relative to the tip holding part 13. The brush holding part 22 has a bracket 23 provided for hanging the cap 30 at the proximal end (one side supported by the tip holding part 13) of the brush holding part 22, and holds the brush 21 at the tip side (the other side remote from the bracket 23) of the brush holding part 22. The bracket 23 has a magnet (not illustrated).

The magnet holds the cap 30 hanging from the bracket 23 with a magnetic force.

Figure 4A:
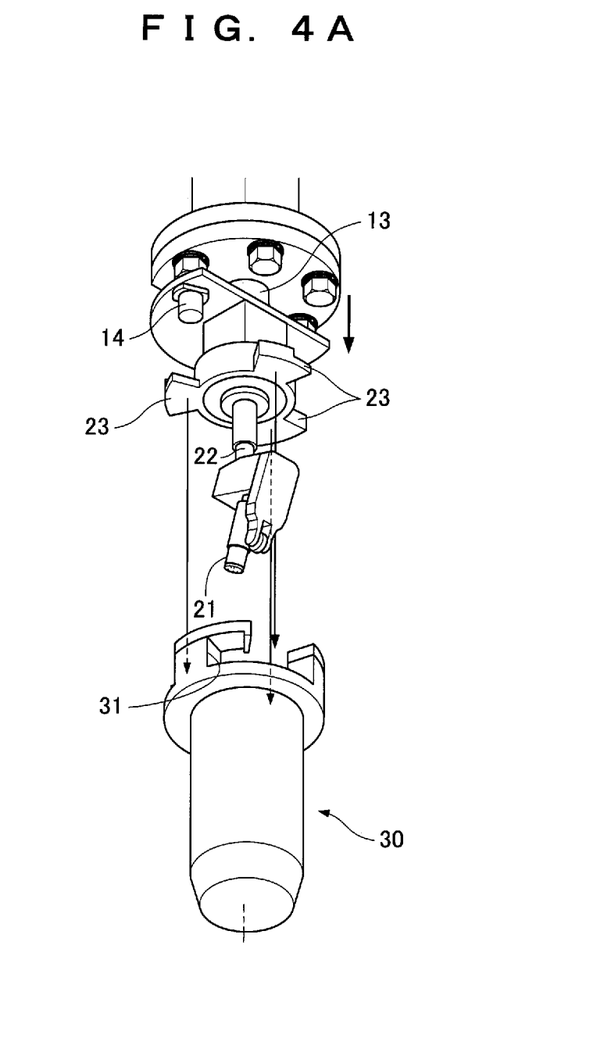
FIG. 4A is a perspective view illustrating a method of attaching a cap to a brush in the application robot according to the present invention.
Figure 4B:
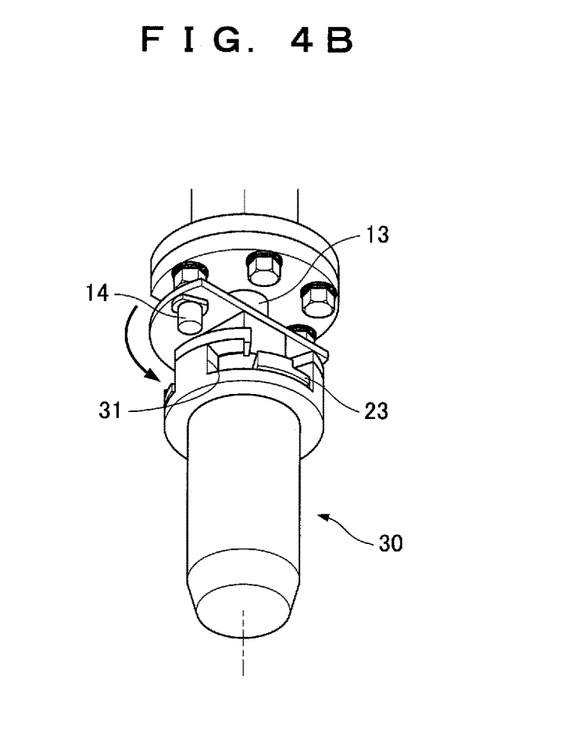
FIG. 4B is a perspective view illustrating the method of attaching the cap to the brush in the application robot according to the present invention.
Figure 4C:
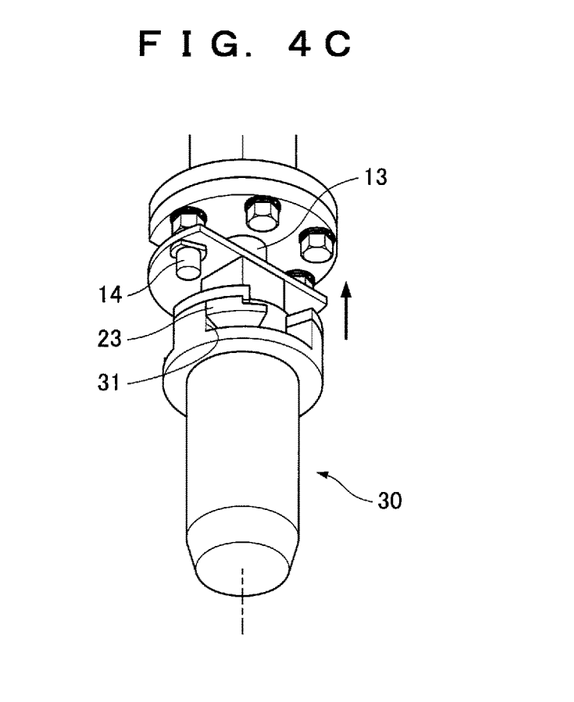
FIG. 4C is a perspective view illustrating the method of attaching the cap to the brush in the application robot according to the present invention.

As illustrated in FIGS. 1 and 4A to 4C, the cap 30 is formed into a closed-end cylinder that can accommodate the brush 21. The cap 30 is mounted on the brush holding part 22 so as to receive the primer dripping from the brush 21. A hanging groove 31 is formed on one end of the cylinder of the cap 30. The hanging groove 31 is fit onto the bracket 23 of the brush holding part 22, so that the cap 30 is fixed to the bracket 23. Specifically, as illustrated in FIG. 4B, the brush holding part 22 is rotated relative to the cap 30 while the hanging groove 31 of the cap 30 and the bracket 23 of the brush holding part 22 are engaged. Consequently, as illustrated in FIG. 4C, the cap 30 is fixed to the bracket with the hanging groove 31 hooked onto the bracket 23.

As illustrated in FIG. 2, the camera 40 is, for example, an optical camera (CCD camera) fixed to the tip holding part 13 of the arm 12. The camera 40 is directed to the other side of the cover 15 (the opening side of the cover 15) and captures, from above the car body 90, images of a specific part of the car body 90 conveyed to the predetermined position S by the conveyor 95 and a bonding surface at the front part of the car body 90, where the windshield is to be bonded (the position of application of the primer on the car body 90).

Figure 3:
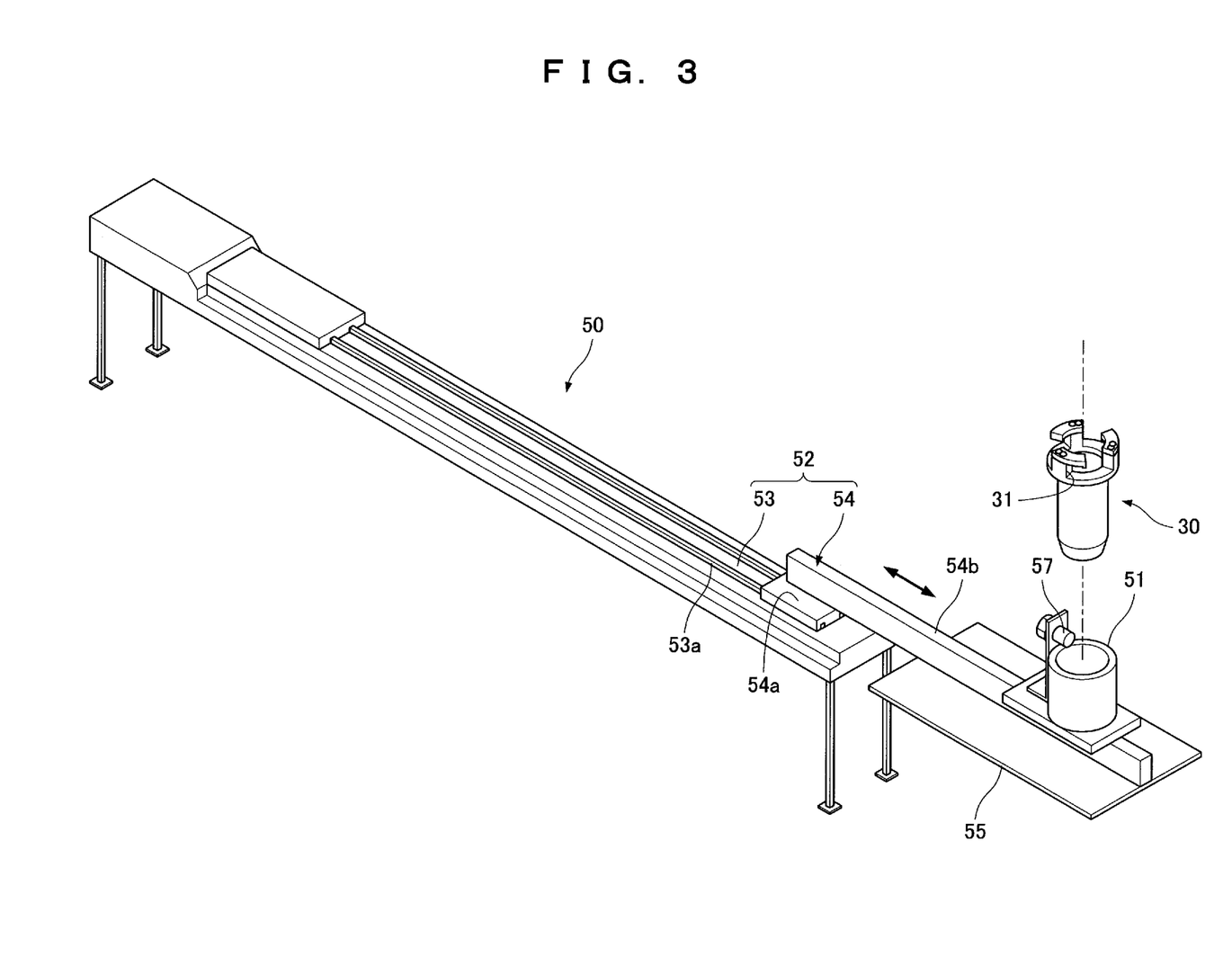
FIG. 3 is a perspective view of a cap attaching/detaching unit for the application robot according to the present invention.

As illustrated in FIGS. 1 and 3, the cap attaching/detaching unit 50 is provided near the robot body as a separate unit of the robot body 11. The cap attaching/detaching unit 50 can move and extend toward the car body 90 conveyed to the predetermined position S by the conveyor 95. The cap attaching/detaching unit 50 includes a cap holding part 51 (an example of "collecting part") that holds the cap 30 and an extending part 52 that supports the cap holding part 51 so as to move and extend toward the car body 90.

The cap holding part 51 is formed into a closed-end cylinder that can accommodate the cap 30. The cap holding part 51 has a cylinder inside diameter larger than the outside diameter of the cap 30. The cap holding part 51 has a magnet (not illustrated) at the bottom of the cylinder. The inserted cap 30 does not float because of the magnetic force of the magnet. The cap holding part 51 collects the cap 30 inserted into the cylinder after the cap 30 is detached from the brush holding part 22 of the applicator 20. Moreover, the cap holding part 51 holds the cap 30 inserted into the cylinder before the cap 30 is attached to the brush holding part 22 of the applicator 20. A cap sensor 57 for detecting the presence or absence of the cap 30 in the cap holding part 51 is provided on the side of the cap holding part 51.

The extending part 52 comprises a base member 53 provided near the robot body 11 and a slide member 54 that holds the cap holding part 51 and slides relative to the base member 53.

The base member 53 is an elongated member extended from the vicinity of the robot body 11 toward the conveyor 95. The base member 53 slidably supports the slide member 54 on the base member 53. Rails 53*a* for sliding the slide member 54 are formed on the base member 53.

The slide member 54 is a member extended along the base member 53. The slide member 54 includes a coupling part 54*a* slidably supported on the top surface of the base member 53 and a long support member 54*b* fixed to the coupling part 54*a*. The support member 54*b* supports the cap holding part 51 at the tip of the support member 54*b*. The coupling part 54*a* of the slide member 54 slides on the top surface of the base member 53, so that the support member 54*b* of the slide member 54 extends toward the car body 90 or retracts toward the robot body 11 (away from the car body 90) while supporting the cap holding part 51.

The receiving pan 55 is a horizontally provided flat member. The receiving pan 55 is provided for the extending part 52 of the cap attaching/detaching unit 50. Specifically, the receiving pan 55 is attached to the underside of the support member 54*b* of the slide member 54 for the extending part 52. The receiving pan 55 is attached to the support member 54*b* of the slide member 54 and thus moves toward the car body 90 or moves toward the robot body 11 (away from the car body 90) along with the support member 54*b* of the slide member 54 when the coupling part 54*a* of the slide member 54 slides along the rails 53*a* of the base member 53.

As illustrated in FIG. 1, the brush holder 56 is provided near the robot body 11. The brush holder 56 is formed into an closed-end cylinder that can accommodate the inserted brush 21. The primer is placed in the brush holder 56. The brush 21 is inserted into the brush holder 56 and thus can be kept in a volatile atmosphere of the primer, so that the brush 21 can be prevented from being hardened with the primer when the primer is not applied.

The controller 60 includes, for example, a personal computer provided with a central processing unit and storage devices such as a hard disk or includes a general purpose computer, e.g., a PC server. The controller 60 performs information processing based on inputted information. As illustrated in FIG. 5, the controller 60 is connected to the parts of the application robot 10 and controls the overall application robot 10.

When controlling the application robot 10, the controller 60 specifies a position to be coated with the primer on the car body 90 and detects a state of application of the primer on the car body 90.

The controller 60 specifies a position to apply the primer on the car body 90, so that the area to apply the primer by the brush 21 (the path of the brush 21) is determined and the movement of the brush 21 (arm 12) is controlled according to the determined area of application. The controller 60 determines the orientation of each car body 90 (the inclination of the car body 90) conveyed to the predetermined position S of the primer coating area. Subsequently, according to the determined orientation of the car body 90 (the inclination of the car body 90), the controller 60 corrects the path of the brush 21 on the car body 90 during the application of the primer to the car body 90.

The controller 60 determines the orientation of the car body 90 (the inclination of the car body 90) by detecting the position of a specific part of the car body 90. The specific part of the car body 90 means a point specified on the car body 90 as a criterion for determining the orientation of the car body 90 (the inclination of the car body 90). Specifically, three points are specified on the car body 90 so as to determine the orientation of the car body 90. Moreover, the specific part of the car body 90 is located at a different position from the bonding surface at the front part of the car body 90, where the windshield is to be bonded (the position of application of the primer on the car body 90). The number of specific parts to be detected on the car body 90 is not limited to three. It may be two or less or four or more as long as the orientation of the car body 90 can be determined. The specific part of the car body 90 may be located at the same position as the position of application of the primer on the car body 90.

The controller 60 detects the position of the specific part on the car body 90 based on image data on the car body 90 transmitted from the camera 40 (an image of the car body 90 captured by the camera 40). Specifically, in the application robot 10, the camera 40 and the controller 60 constitute a position sensor that detects the position of the specific position on the car body 90.

The controller 60 controls the arm 12 so as to move the camera 40 along the specific part on the car body 90 during the detection of the position of the specific part on the car body 90. In other words, when the position of the specific part on the car body 90 is detected, the controller 60 moves the camera 40 along a position other than the position of application of the primer on the car body 90.

Moreover, the controller 60 detects a state of application of the primer on the car body 90 based on the image data on the car body 90 transmitted from the camera 40 (an image of the car body 90 captured by the camera 40). In other words, in the application robot 10, the position sensor including the camera 40 and the controller 60 detects the position of the specific part on the car body 90 and a state of application of the primer applied by the applicator 20 to the car body 90. The camera 40 is provided along with the applicator 20 at the tip holding part 13 of the arm 12 and is moved with the applicator 20 by activating the arm 12, therefore it follows the movement of brush 21 along the bonding surface at the front part of the car body 90, where the windshield is to be bonded (the position on the car body 90 to apply the primer) so as to capture the image of a state of car body 90 after the brush 21 applied the primer (the path of the brush 21).The controller 60 detects a state of application of the primer on the car body 90 from image data on a state of the car body 90 (the path of the brush 21) captured by the camera 40.

The operations of the application robot 10 will be described below. The operations of the application robot 10 are controlled by the controller 60 and the parts of the application robot 10 operate in response to an instruction from the controller 60. Thus, the explanation of the instruction from the controller 60 to the parts of the application robot 10 is omitted.

As illustrated in FIG. 1, in the application robot 10, the brush 21 is inserted into the brush holder 56 at the start of application of the primer to the car body 90 (during standby). At the start of the transportation of the car body 90 to the predetermined position S of the primer application area, the arm 12 moves the brush 21 from the brush holder 56 to the cap holding part 51 of the cap attaching/detaching unit 50. At this point, the slide member 54 of the extending part 52 is retracted near the robot body 11 (away from the car body 90) and thus the cap holding part 51 of the cap attaching/detaching unit 50 is placed in a standby state near the robot body 11 (away from the car body 90). Moreover, the cap 30 is inserted into the cap holding part 51.

When the brush 21 moves to the cap holding part 51, the arm 12 places the brush 21 into the cap 30 inserted into the cap holding part 51. When the brush 21 is placed into the cap 30, the brush holding part 22 of the applicator 20 rotates relative to the cap 30 inserted into the cap holding part 51. Thus, the bracket 23 of the brush holding part 22 is caught by the hanging groove 31 of the cap 30 and the cap 30 is fixed to the brush holding part 22. In short, the cap 30 is attached to the brush 21.

The car body 90 is conveyed to the predetermined position S of the primer application area and is positioned at the predetermined position S by the conveyor 95. At this point, the arm 12 moves the camera 40 and the applicator 20 toward the car body 90. The cap 30 attached to the brush 21 prevents the primer from dripping onto the car body 90 from the brush 21 during the movement of the applicator 20.

The arm 12 moves the camera 40 and the applicator 20 sequentially to each of positions above three specific parts on the car body 90. At this point, the camera 40 sequentially captures the images of each of the three specific parts on the car body 90 and transmits captured image data to the controller 60.

Based on the image data transmitted from the camera 40, the controller 60 detects the position of the specific part on the car body 90 and specifies a position to apply the primer on the car body 90.

The cap attaching/detaching unit 50 slides the slide member 54 of the extending part 52 from the vicinity of the robot body 11 toward the car body 90 when the camera 40 and the applicator 20 start moving to the specific part on the car body 90, so that the cap holding part 51 and the receiving pan 55 are moved to the car body 90. Hence, as illustrated in FIG. 1, the cap holding part 51 and the receiving pan 55 move to the starting position of application of the primer on the car body 90. The receiving pan 55 is disposed to cover the car body 90 near the starting position of application of the primer.

When the camera 40 and the applicator 20 go round to the specific parts on the car body 90 and return to the starting position of application of the primer, the arm 12 inserts the cap 30 into the cap holding part 51. When the cap 30 is inserted into the cap holding part 51, the brush holding part 22 of the applicator 20 rotates relative to the cap 30 inserted into the cap holding part 51. This disengages the bracket 23 of the brush holding part 22 from the hanging groove 31 of the cap 30, thereby detaching the cap 30 from the brush holding part 22. In short, the cap 30 is detached from the brush 21.

When the cap 30 is detached from the brush holding part 22, the arm 12 moves the brush 21 to the starting position of application of the primer. At this point, the brush 21 moves above the receiving pan 55, so that the primer dripping from the moving brush 21 does not fall onto the car body 90.

When the brush 21 moves to the starting position of application of the primer, an application operation of the primer on the car body 90 is started. At the start of the application operation of the primer, the cap attaching/detaching unit 50 slides the slide member 54 of the extending part 52 from the starting position of application of the primer toward the robot body 11, moving the cap holding part 51 and the receiving pan 55 to a position where interference with the brush 21 does not occur. Moreover, the arm 12 moves the brush 21 along the bonding surface at the front part of the car body 90, where the windshield is to be bonded (the position of application of the primer on the car body 90). At this point, the camera 40 captures an image of the bonding surface at the front part of the car body 90, where the windshield is to be bonded after the passage of the brush 21 that applies the primer, and then the camera 40 transmits captured image data to the controller 60.

Based on the image data transmitted from the camera 40, the controller 60 detects a state of application of the primer on the car body 90 and evaluates the state of application of the primer on the car body 90 after the application operation of the primer.

When the brush 21 moves around the bonding surface at the front part of the car body 90, where the windshield is to be bonded and returns to the starting position of application of the primer, the cap attaching/detaching unit 50 slides the slide member 54 of the extending part 52 toward the car body 90 and moves the cap holding part 51 and the receiving pan 55 to the starting position of application of the primer.

When the cap holding part 51 and the receiving pan 55 move to the starting position of application of the primer, the arm 12 moves the brush 21 along the receiving pan 55 so as to pass immediately above the receiving pan 55, and then the arm 12 moves the brush 21 to the brush holder 56 and inserts the brush 21 into the brush holder 56 while avoiding the car body 90. In this case, the brush 21 moves immediately above the receiving pan 55 disposed to cover the car body 90, so that the primer dripping from the moving brush 21 does not fall onto the car body 90. Moreover, the brush 21 can be moved to the brush holder 56 without attaching the cap 30, thereby reducing the operation time of the overall application operation.

When the brush 21 moves to the brush holder 56, the cap attaching/detaching unit 50 slides the slide member 54 of the extending part 52 from the staring position of application of the primer toward the robot body 11 and moves the cap holding part 51 and the receiving pan 55 to the vicinity of the robot body 11.

As has been discussed, according to the present embodiment, the applicator 20 can start applying the primer to the car body 90 from a state in which the cap 30 is collected into the cap holding part 51 of the cap attaching/detaching unit 50 that moves toward the car body 90, thereby quickly and automatically performing the coating operation of the primer without dripping the primer to a position other than a position to apply the primer on the car body 90.

According to the present embodiment, the camera 40 and the brush 21 with the attached cap 30 are moved by the same arm 12 during the detection of the position of the specific part on the car body 90, and the camera 40 and the brush 21 without the cap 30 are moved by the same arm 12 during the application of the primer to the car body 90. Thus, the overall configuration of the application robot 10 can be simplified by using the same arm 12 constituting a member for moving the camera 40 and the brush 21; meanwhile, dripping of the primer from the moving brush 21 is prevented so as to reduce failures caused by dripping of the primer onto the car body 90.

According to the present embodiment, the position of the specific part on the car body 90 and a state of application of the primer on the car body 90 by the applicator 20 are detected based on images captured by the same camera 40. This eliminates the need for providing a separate camera 40 for each time of detection, thereby simplifying the overall configuration of the application robot 10.

According to the present embodiment, the receiving pan 55 can move to the car body 90, so that the primer dripping from the brush 21 located above the car body 90 can be received without falling to a position other than a position to apply the primer on the car body 90. This can prevent the primer dripping from the brush 21 from falling onto the car body 90 before and after the application of the primer on the car body 90, thereby reducing failures caused by dripping of the primer onto the car body 90.

In the present embodiment, the application robot 10 is used for applying primer. However, the application robot 10 may apply adhesive, paint and the like onto the car body 90 as long as the robot applies fluid agents onto conveyed objects on the conveyer 95.

In the present embodiment, the application robot 10 applies primer onto the car body 90. However, the application robot may apply agents onto vehicles other than cars, or even devices other than vehicles, as long as the robot applies agents onto the object conveyed on the conveyer 95.

In the present embodiment, the position sensor for detecting the position of the specific part on the car body 90 includes, but is not limited to, the camera 40 and the controller 60. The camera 40 may be replaced with a laser distance sensor, an ultrasonic sensor or the like as long as the position of the specific part on the car body 90 can be detected. Moreover, in the present embodiment, image data transmitted from the camera 40 is processed by the controller 60 that controls the overall application robot 10, so that the position of application of the primer is specified. The configuration is not particularly limited. A processor independent of the controller 60 may process the image data so as to specify the position of application of the primer.

In the present embodiment, the cap attaching/detaching unit 50 is provided as a separate unit near the robot body 11. However, the cap attaching/detaching unit 50 may be provided at any position such as at the lower fixed part of the robot body 11 as a part of it, or on the same base (foundation) as a base (a foundation set on a floor) for loading the robot body 11 as long as the cap 30 is attachable and detachable to and from the brush 21.

REFERENCE SIGNS LIST 10 application robot
20 applicator
30 cap (dripping preventing member)
40 camera (position sensor, imaging unit)
50 cap attaching/detaching unit (collector)
51 cap holding part (collecting part)
52 extending part
60 controller (position sensor, controller)
90 car body (conveyed object)

What is claimed is:

1. An application robot that applies fluid agents to a conveyed object conveyed by a conveyor, comprising:
    an applicator to apply the fluid agents to the conveyed object;
    a position sensor to detect a position of a specific part on the conveyed object;
    a controller to specify a position to apply the fluid agents based on a detection result of the position sensor;
    a dripping preventing member that is removably provided on the applicator and prevents dripping of the fluid agents when the fluid agents is not applied;
    a collector to collect the dripping preventing member detached from the applicator; and
    an arm that supports the applicator so as to move the applicator to the position to apply the fluid agents,
    wherein the position sensor is provided on the arm along with the applicator, so as to be moved by operation of the arm to detect the position of the specific part on the conveyed object while the dripping preventing member is attached to the applicator, wherein upon the position to apply the agents being specified by the controller and the dripping preventing member being detached, the applicator applies the agents onto the conveyed object, and wherein the collector includes a collection part to collect the dripping preventing member and an extending part to move and extend toward the conveyed object while supporting the collecting part, the collecting part being moved toward the conveyed object by the extension of the extending part so as to collect the dripping preventing member.

2. The application robot according to claim 1, further comprising a receiver to receive the fluid agents dripping from the applicator,
    wherein the receiver is provided on the collector and is moved to the conveyed object by the extension and movement of the extending part.

3. The application robot according to claim 1, wherein the position sensor includes:
    an imaging unit to capture an image of the conveyed object, and
    the position sensor detects the position of the specific part on the conveyed object and a state of application of the fluid agents by the applicator on the conveyed object based on the image of the conveyed object, the image being captured by the imaging unit.

4. The application robot according to claim 1, wherein the conveyed object is a body,
    the position sensor detects, from above the body, a position of a specific part on the body, and
    the applicator applies the fluid agents from above the body.

* * * * *